United States Patent
Fang et al.

(10) Patent No.: US 9,742,860 B2
(45) Date of Patent: Aug. 22, 2017

(54) BI-TEMPORAL KEY VALUE CACHE SYSTEM

(75) Inventors: Ru Fang, Beijing (CN); Bin He, San Jose, CA (US); Hui-I Hsiao, Saratoga, CA (US); Chandrasekaran Mohan, San Jose, CA (US); Rene Mueller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 13/406,758

(22) Filed: Feb. 28, 2012

(65) Prior Publication Data
US 2013/0226955 A1   Aug. 29, 2013

(51) Int. Cl.
*H04L 29/08*   (2006.01)
(52) U.S. Cl.
CPC ................. *H04L 67/2842* (2013.01)
(58) Field of Classification Search
None
See application file for complete search history.

(56) References Cited

U.S. PATENT DOCUMENTS

| | | | |
|---|---|---|---|
| 6,915,307 B1 * | 7/2005 | Mattis et al. | |
| 7,509,307 B2 * | 3/2009 | Biswal et al. | |
| 8,782,023 B1 * | 7/2014 | Chawathe | G06F 17/30309 707/694 |
| 2010/0235334 A1 | 9/2010 | Porter | |
| 2011/0153603 A1 | 6/2011 | Adiba et al. | |
| 2011/0184886 A1 * | 7/2011 | Shoham | 705/400 |
| 2011/0320419 A1 * | 12/2011 | Johnston et al. | 707/703 |

OTHER PUBLICATIONS

Xu, C., et al. "Using Memcached to Promote Read Throughput in Massive Small-File Storage System", Grid and Cooperative Computing (GCC) 2010, 9th International Conference, Nov. 1-5, 2010, pp. 24-29, Digital Library, IEEE, New York, New York, USA.

* cited by examiner

*Primary Examiner* — Alex Gofman
*Assistant Examiner* — Umar Mian
(74) *Attorney, Agent, or Firm* — Ference & Associates LLC

(57) ABSTRACT

Described herein are techniques for supporting bi-temporal data in a key value cache system. An embodiment provides bi-temporal data as the basic functionality of a key value cache system. An embodiment provides a redesign of the core data structures of a key value cache system, adds bi-temporal data storage in the key value hashing structure, and provides a temporality-aware memory space manager. Embodiments can achieve the same performance as current key value cache systems for regular queries (that is, the queries that only access the current versions of data) while supporting bi-temporal data.

16 Claims, 10 Drawing Sheets

BI-TEMPORAL KEY VALUE CACHE SYSTEM

BACKGROUND

Key value cache systems, for example Memcached, have become quite popular, in part because of the fast growth of Web 2.0 web sites. Many large web sites, such as youtube.com, facebook.com, twitter.com, and wikipedia.com, are built using key value cache systems. Because the performance of relational databases cannot support the scalability of those large web sites, Memcached is used to cache the hot data and thus avoid database access for most data queries. Key value cache systems currently do not support temporal features for data. Youtube is a registered trademark of Google Incorporated in the United States and/or other countries. Facebook is a registered trademark of Facebook Incorporated in the United States and/or other countries. Twitter is a registered trademark of Twitter Incorporated in the United States and/or other countries.

BRIEF SUMMARY

In summary, one aspect provides a method for providing a bi-temporal key value cache system, comprising: storing a key directory having at least one key element pointing to a data object; receiving a query request for said data object, said data object being stored in a key value cache; responsive to receiving said query request for said data object stored in said key value cache, searching said key directory for said at least one key element pointing to said data object; identifying said at least one key element pointing to said data object requested; searching a current table and a historical table stored in said key value cache for said data object requested, wherein both a current version and at least one historical version of said data object are stored in said key value cache; determining from said current version and at least one historical version of said data object which version is to be returned; reading said determined version of said data object from said key value cache using a pointer to said determined version of said data object; and returning said determined version of said data object in response to said query request for said data object.

Another aspect provides a computer program product for providing a bi-temporal key value cache system, comprising: a computer readable storage medium having computer readable program code embodied therewith, the computer readable program code comprising: computer readable program code configured to store a key directory having at least one key element pointing to a data object; computer readable program code configured to receive a query request for said data object, said data object being stored in a key value cache; computer readable program code configured to, responsive to receiving said query request for said data object stored in said key value cache, search said key directory for said at least one key element pointing to said data object; computer readable program code configured to identify said at least one key element pointing to said data object requested; computer readable program code configured to search a current table and a historical table stored in said key value cache for said data object requested, wherein both a current version and at least one historical version of said data object are stored in said key value cache; computer readable program code configured to determine from said current version and at least one historical version of said data object which version is to be returned; computer readable program code configured to read said determined version of said data object from said key value cache using a pointer to said determined version of said data object; and computer readable program code configured to return said determined version of said data object in response to said query request for said data object.

A further aspect provides a system for providing a bi-temporal key value cache system, comprising: at least one processor; and a memory device operatively connected to the at least one processor; wherein, responsive to execution of program instructions accessible to the at least one processor, the at least one processor is configured to: store a key directory having at least one key element pointing to a data object; receive a query request for said data object, said data object being stored in a key value cache; responsive to receiving said query request for said data object stored in said key value cache, search said key directory for said at least one key element pointing to said data object; identify said at least one key element pointing to said data object requested; search a current table and a historical table stored in said key value cache for said data object requested, wherein both a current version and at least one historical version of said data object are stored in said key value cache; determine from said current version and at least one historical version of said data object which version is to be returned; read said determined version of said data object from said key value cache using a pointer to said determined version of said data object; and return said determined version of said data object in response to said query request for said data object.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
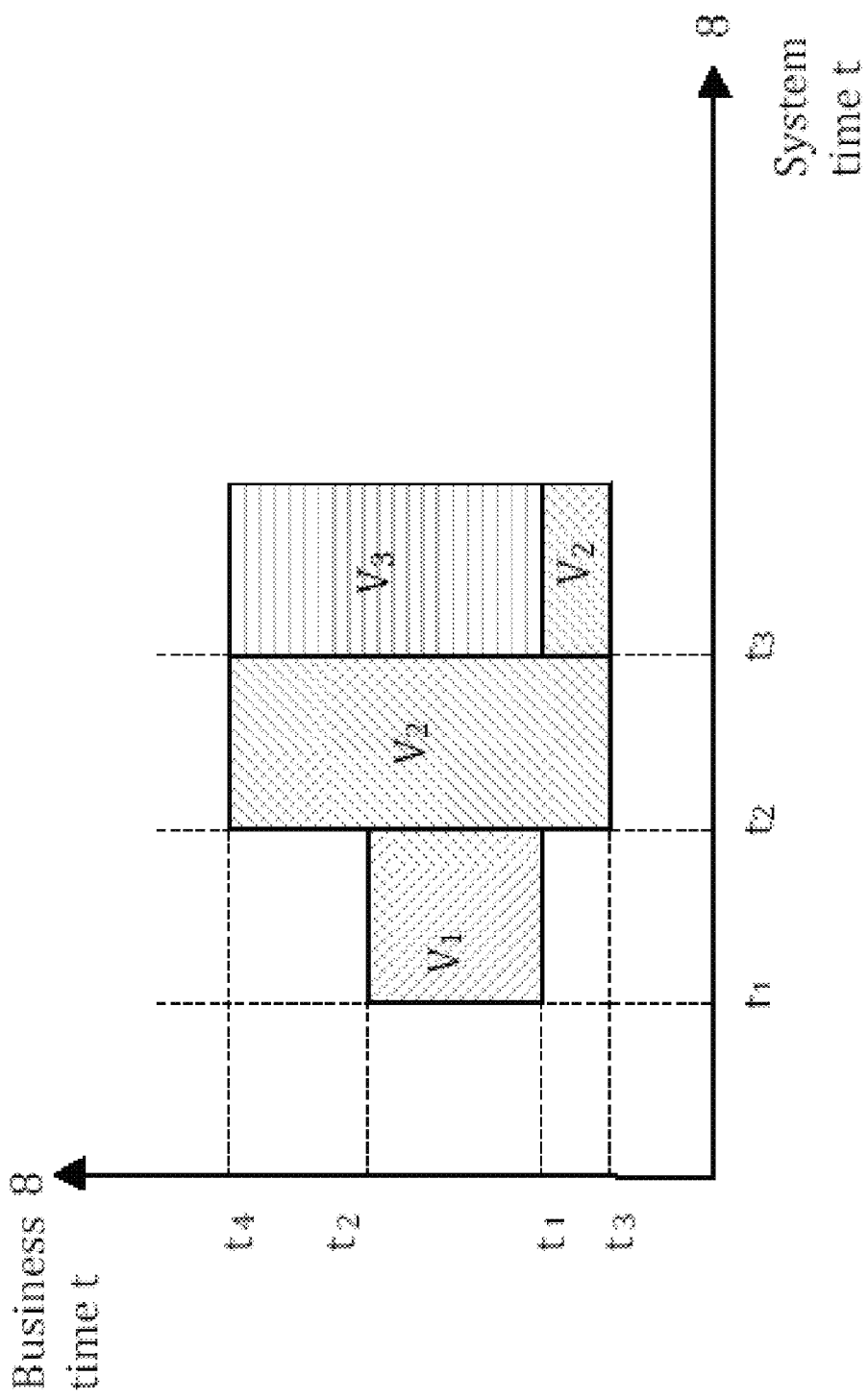
FIG. 1 illustrates business and transaction times.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Supporting bi-temporal data is important for data management, as applications often need the historical versions of data for various reasons. For instance, some applications may contain data errors and thus require the ability to go back to historical versions. Some other applications may be interested in querying the historical changes/trends of data to obtain business insight. A bi-temporal feature has been studied previously in the database community, and implemented in some off-the-shelf database systems such as IBM® DB2 database software. However, although very useful, a bi-temporal feature has not yet been supported by any key value cache system.

With the importance of bi-temporal data in the relational domain, providing for caching of bi-temporal data in key value cache systems would greatly augment such key value cache systems. Accordingly, an embodiment provides bi-temporal data as the basic functionality of a key value cache system. Specifically, an embodiment provides a redesign of the core data structures of a key value cache system in the following ways. An embodiment adds bi-temporal data storage in the key value hashing structure, and designs a temporality-aware memory space manager. An important consideration in the redesign is the high performance of the system. Accordingly, embodiments ensure that the system can achieve the same performance as current key value cache systems for regular queries (that is, the queries that only access the current versions of data).

Furthermore, an embodiment provides a design that has good compatibility, as follows. The design is compatible with existing Memcached interfaces. That is, existing Memcached applications (currently without bi-temporal support) can still run using the system described herein. The design is scalable in the same way as Memcached in that it is possible to apply existing partition and consistent hashing strategies on the system described herein.

Bi-Temporal Semantics

Most data store queries are only concerned with data as of now, that is, the current version of data. Bi-temporal data stores permit queries over two orthogonal time dimensions: business time and transaction time. Business time is the time interval, [Valid_from, Valid_to), during which a fact was, is, or will be valid in reality. Transaction time is the time interval, [Create_time, Update_time), during which the data is physically created and updated in the data store. To support this time-based query, a bi-temporal data store must store both the new versions (current data) and the old versions (historical data) of an object (once it is updated).

Referring generally to FIG. 1, an example is used to demonstrate bi-temporal semantics. The X-axis represents the system time, and Y-axis represents the business time. At time $t_1$, an object ($V_1$), valid from $\tau_1$ to $\tau_2$ is created. The creation time of this object is $t_1$, and the update time is $\infty$.

At time $t_2$, this object is updated to a new version, $V_2$, which is valid from $\tau_3$ to $\tau_4$. The creation time of $V_2$ is $t_2$ and the update time is $\infty$. The update time of the old version, $V_1$ is changed from $\infty$ to $t_2$, and $V_1$ is stored by an embodiment as historical data. Because $\tau_3$ is previous to $\tau_1$, and $\tau_4$ is later than $\tau_2$, $V_1$ can be considered as being in-place updated to $V_2$.

At time $t_3$, this object, $V_2$, is updated again. The new version, $V_3$, is valid from $\tau_1$ to $\tau_4$, and with creation time $t_3$ and update time $\infty$. $[\tau_1, \tau_4)$ is only a portion of $[\tau_3, \tau_4)$, so the previous version $V_2$ can be considered as being split into two versions, $V_3$ and a new $V_2$. The business time of the new $V_2$ is $[\tau_3, \tau_1)$ and the system time is $[t_3, \infty)$. The old $V_2$ (business time $[\tau_3, \tau_4)$ and system time $[t_2, t_3)$) is stored as historical data.

Table 1 provides a summary of the historical data and current data changes during the update process. Based on this table, an embodiment searches in either current data or historical data to find the correct version to return from cache. For example:

If a query is issued for the object which is valid at $\tau_5$ ($\tau_1 < \tau_5 < \tau_2$) as if it is at $t_4$ ($t_4 > t_3$), an embodiment searches in the current data and $V_3$ is returned to the user.

If a query is issued for the object which is valid at the same $\tau_5$ as if it is at $t_5$ ($t_2 < t_5 < t_3$), an embodiment searches in the history data and $V_2$ is returned to the user.

TABLE 1

| | Current data | | | History data | | |
|---|---|---|---|---|---|---|
| Time | Version | Business time | System time | Version | Business time | System time |
| $t_1$ | $V_1$ | $[\tau_1, \tau_2)$ | $[t_1, \infty)$ | | | |
| $t_2$ | $V_2$ | $[\tau_3, \tau_4)$ | $[t_2, \infty)$ | $V_1$ | $[\tau_1, \tau_2)$ | $[t_1, t_2)$ |
| $t_3$ | $V_2$ | $[\tau_3, \tau_1)$ | $[t_3, \infty)$ | $V_1$ | $[\tau_1, \tau_2)$ | $[t_1, t_2)$ |
| | $V_3$ | $[\tau_1, \tau_4)$ | $[t_3, \infty)$ | $V_2$ | $[\tau_3, \tau_4)$ | $[t_2, t_3)$ |

Bi-Temporal Key Value Cache

Figure 2:
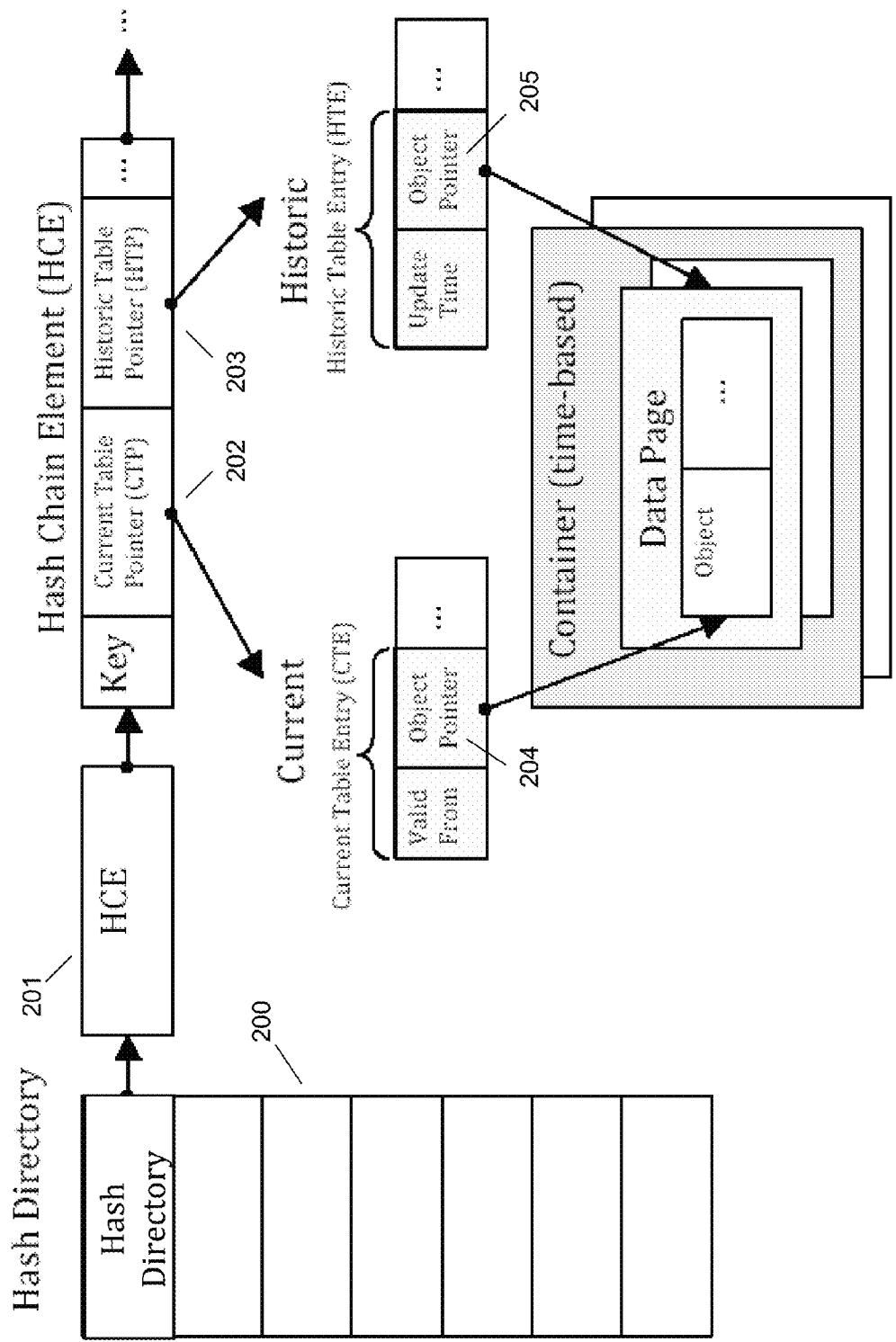
FIG. 2 illustrates example architecture according to an embodiment.

Like most of the current key-value caches (for example, Memcached), an embodiment stores all the objects in main memory, and the hash structure is used to organize all the objects. FIG. 2 illustrates an overview of example architecture.

In each Hash Chain Element (HCE) 201, there are two pointers 202, 203 pointing to two data structure separately, Current Table and History Table. Current Table 202 is used to store current versions of an object. It is sorted by Valid_from time (start time of business time). Because the Valid_from time is not overlapped in the current versions, the Current Table 202 is sorted in time sequence. History Table 203 is used to store the historical versions of an object. It is a sorted array ordered by Update_time (end time of system time). A new History Table 203 entry is appended at the end of the History Table 203. The object can be accessed by using the Object Pointer 204, 205 in a Current Table entry or a History Table entry.

When an embodiment receives an insert request (ORBITS_ADD operation), it looks up the input key in the hash directory 200. If the key does not exist, an embodiment finds a proper data page container based on the update time of this object, and stores the input object in one of the data pages in this container. The update time of a new insert object is infinity, so all the new inserted objects are stored in the data pages in the infinite container. Then a new HCE is created and added to the hash directory 200. A new entry is inserted into the Current Table 202 with a pointer pointing to the location of this object in a data page. After that, the key, object pointer (Hint) and the object creation time are returned to the user.

When an embodiment receives an update request (ORBITS_REPLACE operation), the input key is looked up in the hash directory 200. If a HCE is found (the key exists), an embodiment continues to search in the current table 202 to find the most recent entry of which the Valid_from time is equal to or earlier than the input business time. Then an embodiment reads the object and checks if the Valid_to time of this object is later than the one of the input object. If it is true, an embodiment executes the following actions (illustrated in FIG. 3). Otherwise a not-found error may be returned to the user.

Figure 3:
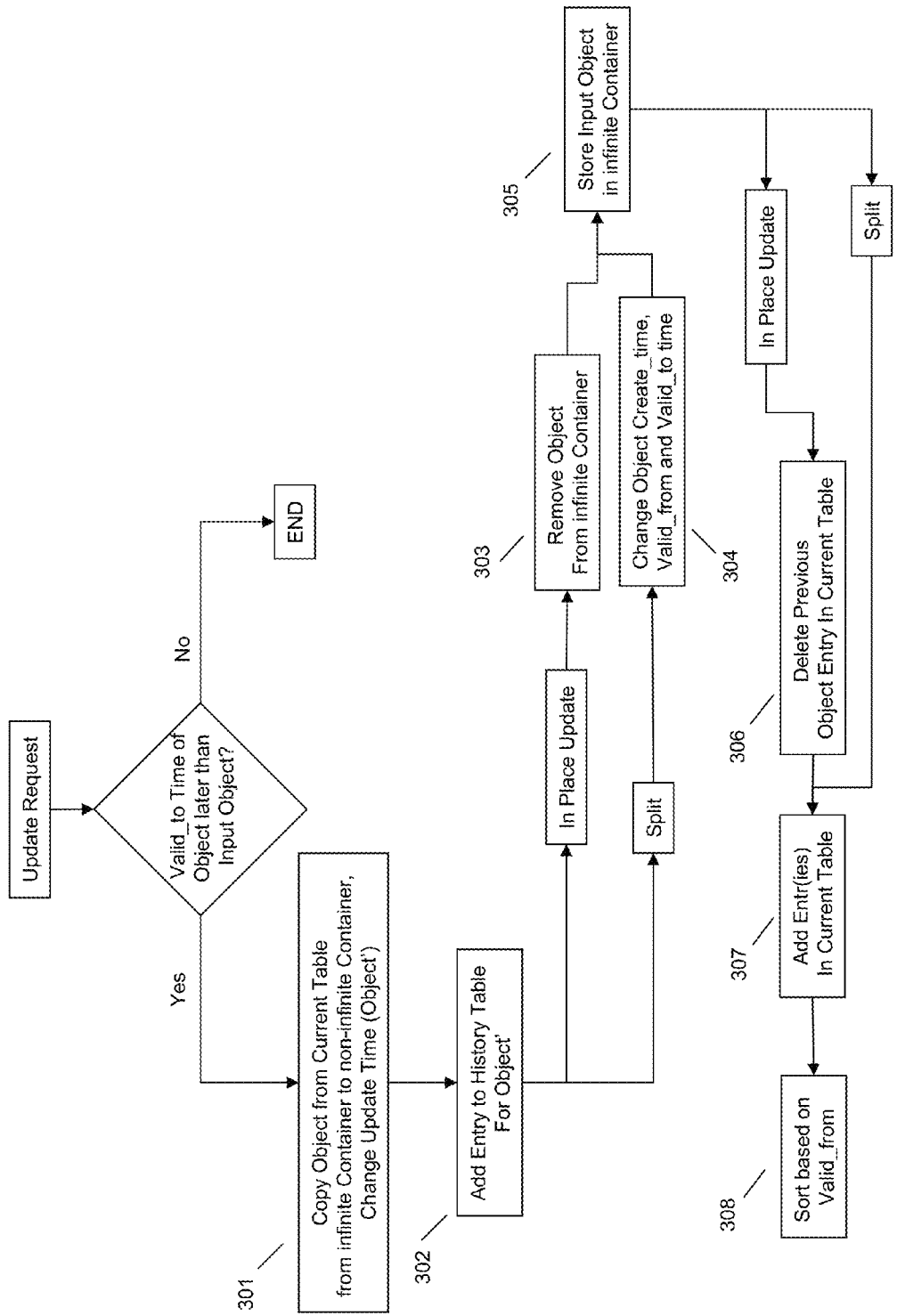
FIG. 3 illustrates example update request processing according to an embodiment.

Referring to FIG. 3, an embodiment first copies the object (O) found in the Current Table entry from the infinite container to a non-infinite container (O'), and changes the Update_time of this object 301. An embodiment then adds an entry to history table 301, which points to the object (O') in step 301. For different update scenarios, an embodiment removes the object (O) found in the Current Table entry from the infinite container (in-place update scenario) 303, or changes the Create_time, Valid_from and Valid_to time of this object (split scenario) 304. An embodiment then stores the input object from client in a data page in the infinite container 305. For an in-place update, an embodiment deletes the previous object (O) entry found in Current Table 306. For different update scenarios, an embodiment adds one (in-place update scenario) or several entries (split scenario) in the Current Table 307; and then sorts the Current Table based on Valid_from time 308.

Figure 4:
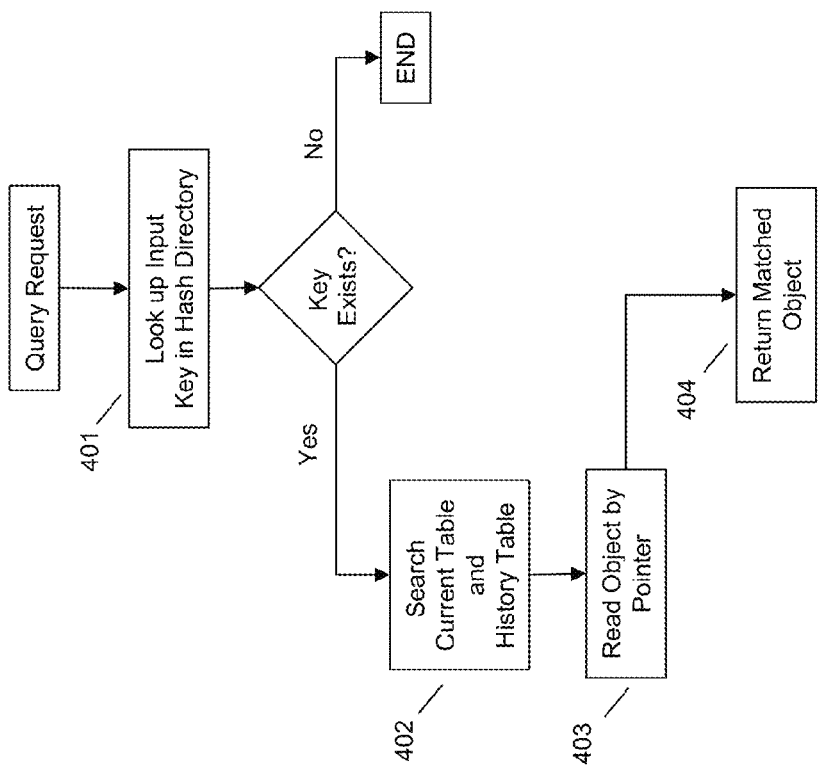
FIG. 4 illustrates example query processing according to an embodiment.

As illustrated in FIG. 4, when an embodiment receives a query request (ORBITS_GET operation), it first looks up the input key in the hash directory 401. If the key exists, it continues to search in both Current Table based on Valid_from time and History Table based on Update_time 402. Once a Current Table entry or a History Table entry is found, an embodiment reads the object by the object pointer and checks if the input business time and system time are matched 403. An embodiment then returns the matched object 404. Most of the queries are about the current data as if the time is now (ORBITS_GET_NOW operation). These queries directly go to the Current Table for query, and most likely the matched object will be at the tail of the Current Table.

Figure 5:
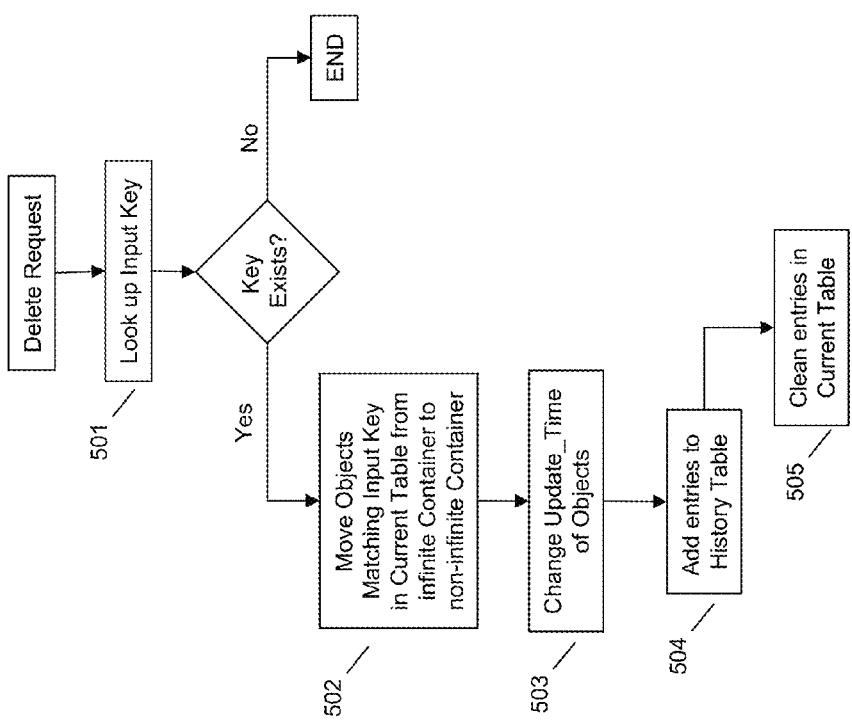
FIG. 5 illustrates example deletion request processing according to an embodiment.

As illustrated in FIG. 5, for a delete request (ORBITS_GET operation), an embodiment first looks up the input key in the hash directory 501. If the key exists, an embodiment moves all the objects matching the input key in the Current Table from the infinite container to a non-infinite container 502, and changes the Update_time of these objects 503. An embodiment then adds entries to History Table which point to the objects referenced above 504. An embodiment then cleans all the entries (CTE) of the objects moved in the Current Table 505.

Temporal Space Management

Figure 6:
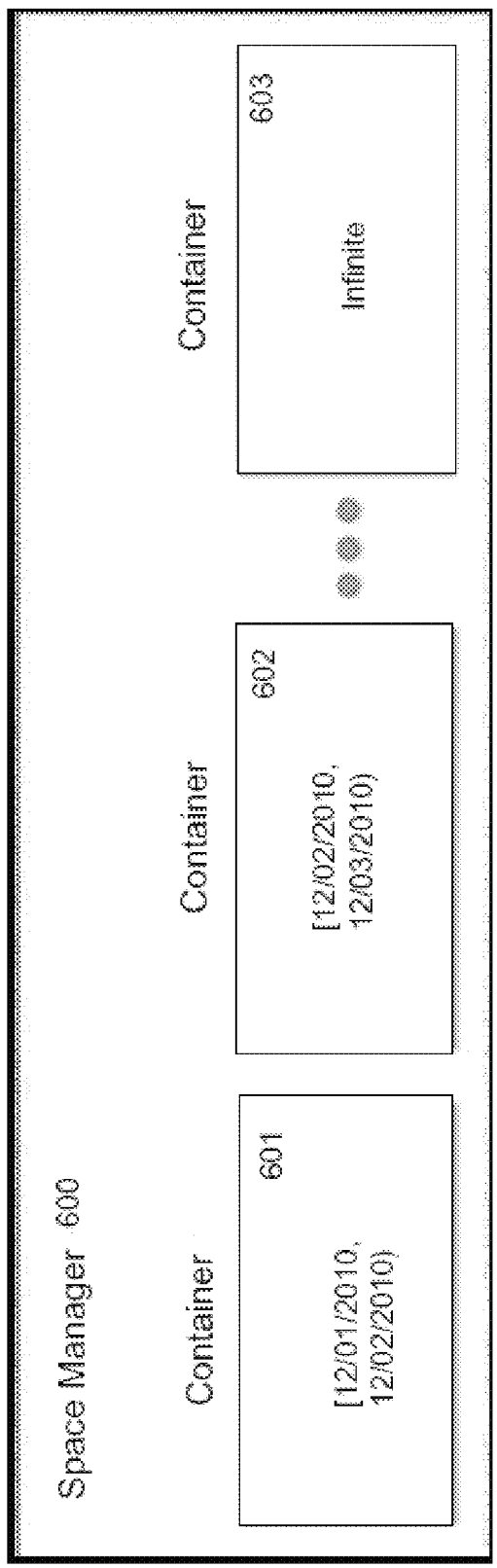
FIG. 6 illustrates an example space manager according to an embodiment.
Figure 7:
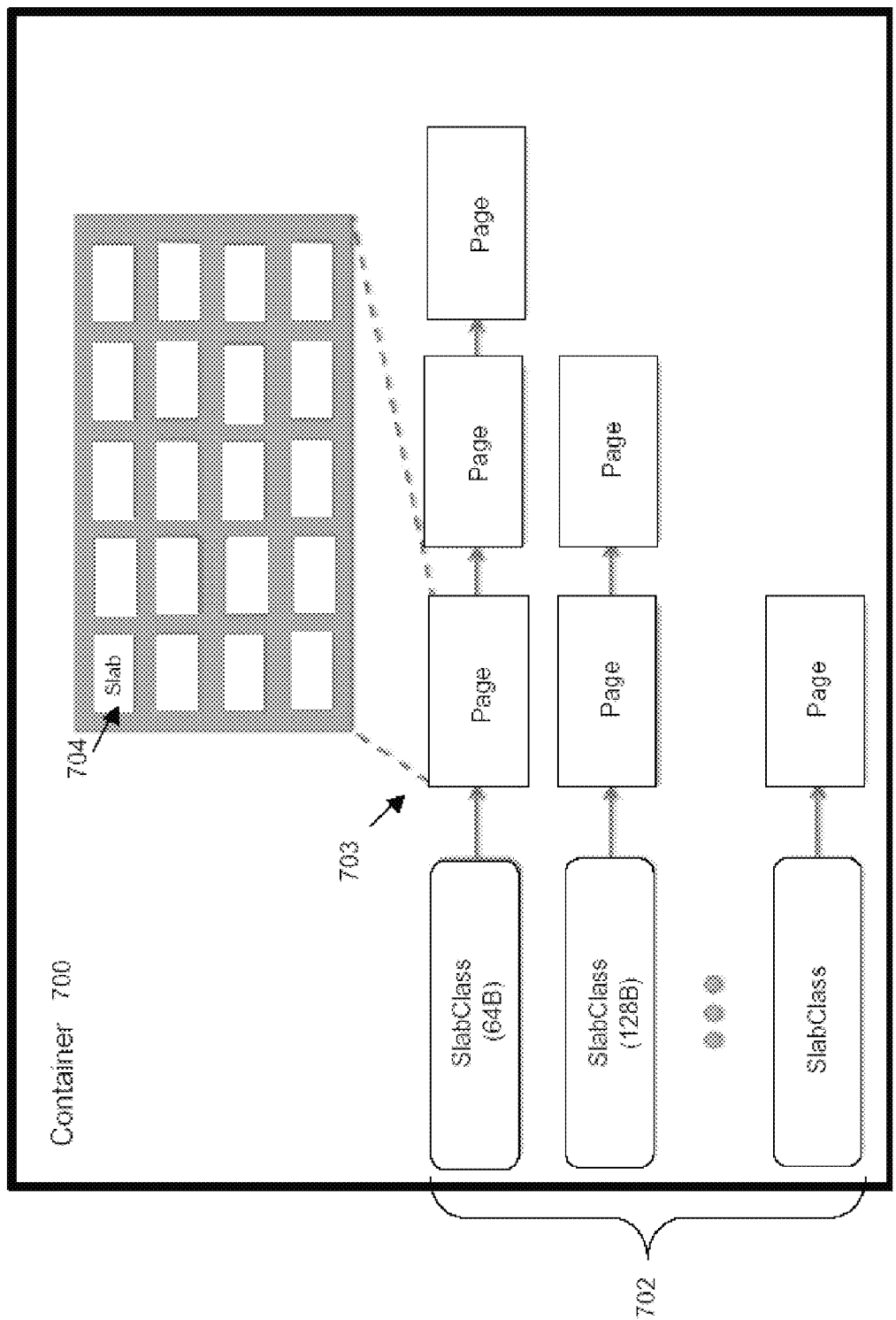
FIG. 7 illustrates an example container according to an embodiment.

The space manager 600 of an embodiment has an array of containers 601-603. Each container 601-603 contains data with system update time in a particular time range, as shown in FIG. 6. The infinite container 603 contains data with system update time as infinite. As shown in FIG. 7, each container 700 has an array of slabclasses 702. Each slabclass stores data with a particular size range. For instance, the first slabclass 702A stores data less than 64 bytes, the second slabclass 702B stores data more than 64 bytes but less than 128 bytes, and so on. Each slabclass contains a linked list of pages 703. Each page has a list of fixed length slabs. For instance, if the slabclass is for 64 bytes, each slab 704 size will be 64 bytes. Each slabclass also has a free slab list to store the slabs that have been freed. Example slab allocation and free interfaces are:

void *container_slab_malloc(size_t size, containertime_t t);

void container_slab_free(void* slab_ptr);

void *container_slab_realloc(void *slab_ptr, size_t newsize);

void *container_slab_copy(void *slab_ptr, containertime_t dest);

The function container_slab_malloc is used to allocate a slab. Slab size and container time are required as the input. The space manager uses the following steps to allocate the space. First, it finds the right container to store the data based on the container time. Next, it finds the right slabclass according to the data size. The space manager then finds a free slab. It first checks whether there is a free slab list having free slabs. If not, it checks whether the last page has free slabs. If not, the slab manager allocates a new page, links this page to the tail, and gets a free slab. The space manager may then return the free slab to the caller.

The function container_slab_is used to free a slab. The space manager uses the following steps to free the space. The space manager finds the right container and slabclass that stores the slab. It puts this slab into the corresponding free slab list. The function container_slab_realloc is used to change the size of an allocated slab. If the new size can not be held using the existing slab, the space manager will malloc a new slab, copy the data into the new slab, and then free the old slab.

The function container_slab_copy is used to copy the content of the slab into a new allocated slab of a different container. The new container is determined by the given new container time.

Thus, an embodiment supports bi-temporal data management within a key value cache system. The example design includes a set of data structures to support efficient put/get operations on bi-temporal data. An embodiment also provides a temporal space manager to effectively manage memory spaces with temporality awareness.

It is understood that embodiments may be implemented in a cloud computing environment, for example functionality of an embodiment may be provided as software as a service (SaaS). Although this disclosure includes description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (for example, mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
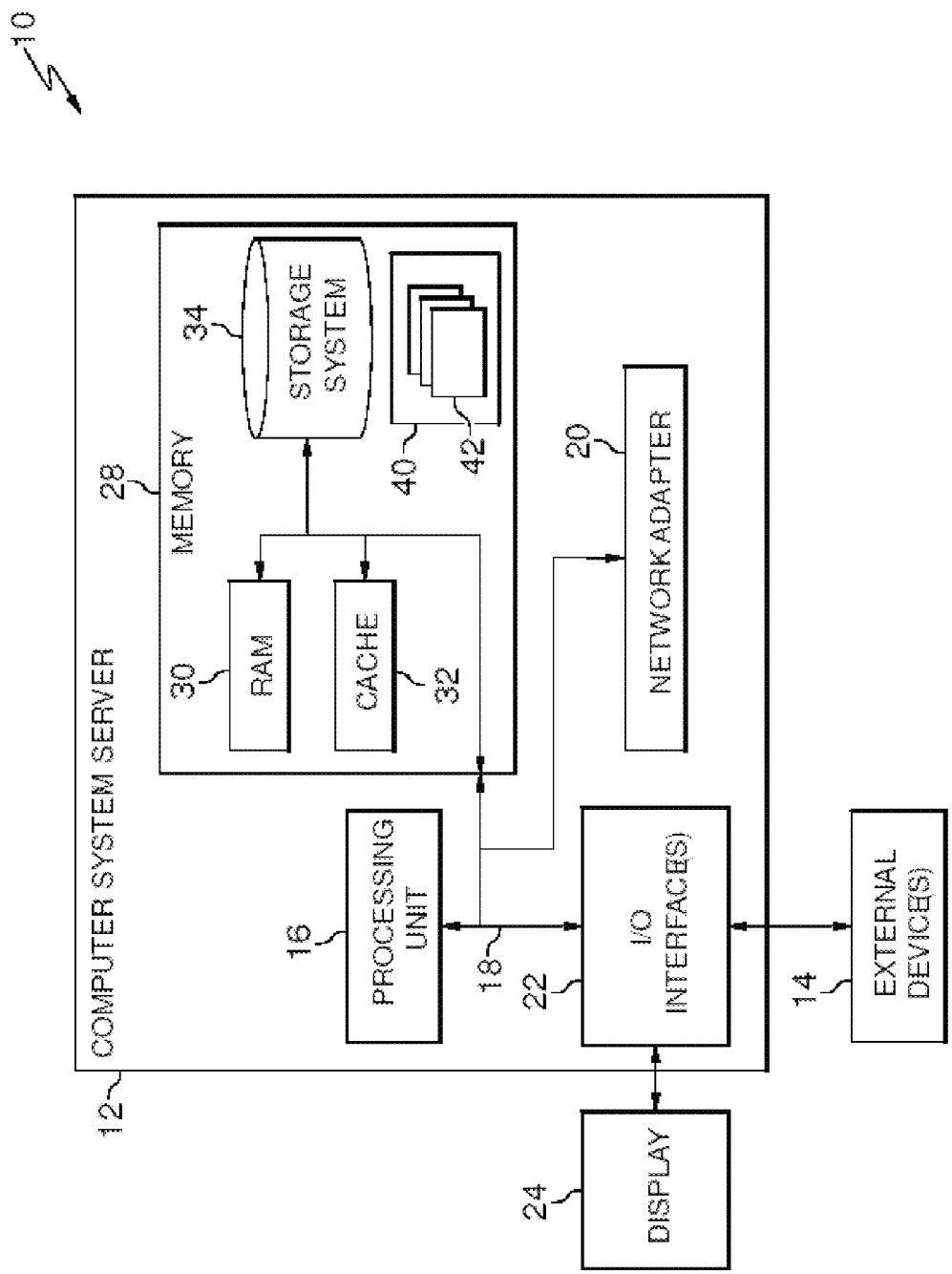
FIG. 8 depicts a cloud computing node according to an embodiment.

Referring now to FIG. 8, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (for example, at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, et cetera; one or more devices that enable a user to interact with computer system/server 12; and/or any devices (for example, network card, modem, et cetera) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, et cetera.

Figure 9:
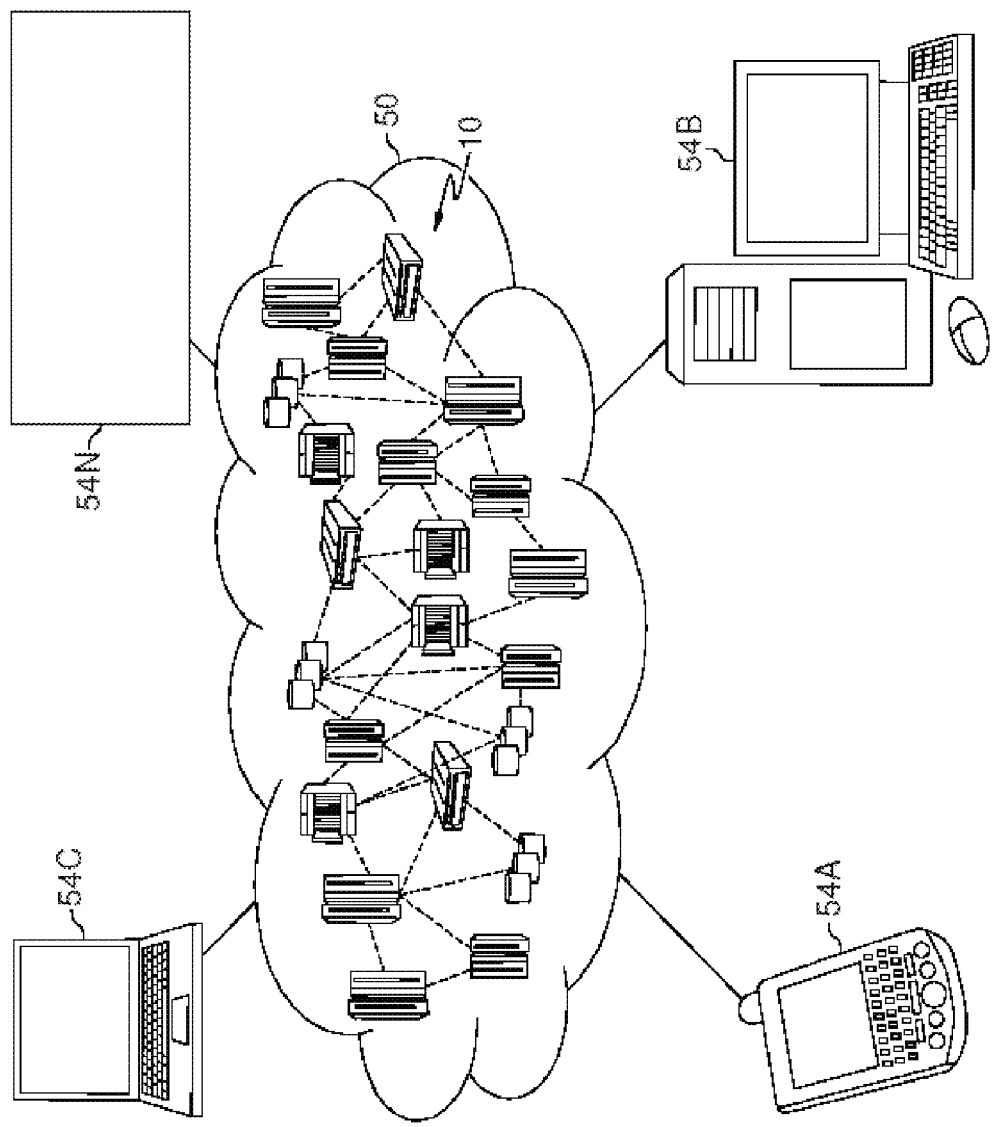
FIG. 9 depicts a cloud computing environment according to an embodiment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (for example, using a web browser).

Figure 10:
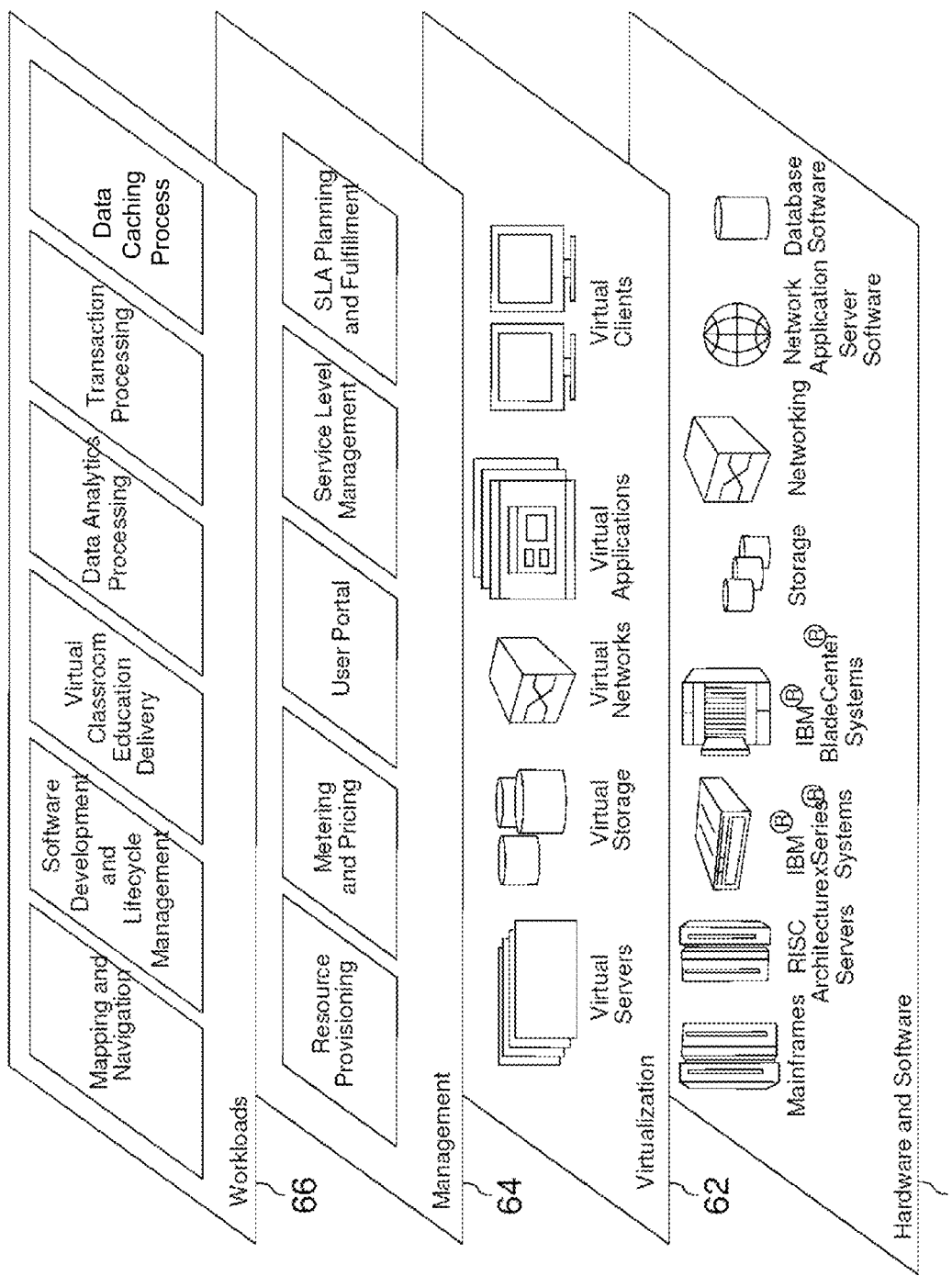
FIG. 10 depicts abstraction model layers according to an embodiment.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation;

software development and lifecycle management; virtual classroom education delivery; data analytics processing; transaction processing; and data caching mechanisms.

As will be appreciated by one skilled in the art, aspects may be embodied as a system, method or computer program product. Accordingly, aspects of the present invention may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects of the present invention may take the form of a computer program product embodied in at least one computer readable medium(s) having computer readable program code embodied thereon.

Any combination of computer readable mediums may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-signal medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described with reference to figures of methods, apparatus (systems) and computer program products according to embodiments. It will be understood that portions of the figures can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for providing a bi-temporal key value cache system, comprising:
   storing a key directory having a plurality of key elements, wherein each key element points to a data object;
   receiving a query request having an associated system time for one of said plurality of data objects, said data object being stored in a key value cache comprising bi-temporal data stored in a current table and a historical table and wherein said current table stores current versions of a plurality of data objects and said historical table stores historical versions of the plurality of data objects, each version having an associated input time, wherein the associated input time of the data objects within the current table comprise a start time and are sorted by start time and wherein the associated input time of the data objects within the historical table comprise an end time and are sorted by the end time;
   responsive to receiving said query request having an associated system time, searching said key directory for at least one key element pointing to said data object, wherein said at least one key element comprises a hash chain element comprising two pointers which point, respectively, to a current version of said data object and at least one historical version of said data object;
   responsive to finding said at least one key element, searching said current table and said historical table for said data object requested and finding both said current version of said data object and said at least one historical version of said data object;
   determining from said current version and said at least one historical version of said data object which version is to be returned, wherein said determining comprises identifying a version from said current version and said at least one historical version where the input time associated with the version matches the system time associated with the query request;

reading said determined version of said data object having an input time matching the system time from said key value cache using a pointer to said determined version of said data object; and returning said determined version of said data object having an input time matching the system time in response to said query request.

2. The method of claim 1, wherein said key directory is a hash directory.

3. The method of claim 1, wherein said searching a current table and a historical table further comprises:

searching the current table based on a valid from time; and searching the historical table based on an update time.

4. The method of claim 1, further comprising:

responsive to a request to delete a data object in said key value cache, moving all data objects matching a key of the request to delete a data object to a non-infinite container and updating said current table and said historical table.

5. The method of claim 1, further comprising:

responsive to a request to update a data object in said key value cache, copying a current version of a data object matching a key of the request to update a data object from an infinite container to a non-infinite container, adding an entry to said historical table, modifying an entry in said current table, and storing an updated data object in an infinite container.

6. The method of claim 5, wherein said modifying an entry in said current table further comprises one of:

removing an entry for the data object matching a key of the request to update a data object from the current table; and updating an entry for the data object matching a key of the request to update a data object in the current table by modifying create time and valid from time for said data object matching a key of the request to update a data object.

7. The method of claim 1, wherein said data object is a cached web page.

8. The method of claim 1, wherein said method is implemented at least in part using software provided as a service in a cloud environment.

9. A computer program product for providing a bi-temporal key value cache system, comprising:

a non-transitory computer readable storage medium having computer readable program code embodied therewith, the computer readable program code comprising:

computer readable program code configured to store a key directory having a plurality of key elements, wherein each key element points to a data object;

computer readable program code configured to receive a query request having an associated system time for one of said plurality of data objects, said data object being stored in a key value cache comprising bi-temporal data stored in a current table and a historical table and wherein said current table stores current versions of a plurality of data objects and said historical table stores historical versions of the plurality of data objects, each version having an associated input time, wherein the associated input time of the data objects within the current table comprise a start time and are sorted by start time and wherein the associated input time of the data objects within the historical table comprise an end time and are sorted by the end time;

computer readable program code configured to, responsive to receiving said query request having an associated system time, search said key directory for at least one key element pointing to said data object, wherein said at least one key element comprises a hash chain element comprising two pointers which point, respectively, to a current version of said data object and at least one historical version of said data object;

computer readable program code configured to responsive to finding said at least one key element, search said current table and said historical table for said data object requested and finding both said current version of said data object and said at least one historical version of said data object;

computer readable program code configured to determine from said current version and said at least one historical version of said data object which version is to be returned, wherein said determining comprises identifying a version from said current version and said at least one historical version where the input time associated with the version matches the system time associated with the query request;

computer readable program code configured to read said determined version of said data object having an input time matching the system time from said key value cache using a pointer to said determined version of said data object; and computer readable program code configured to return said determined version of said data object having an input time matching the system time in response to said query request for said data object.

10. The computer program product of claim 9, wherein said key directory is a hash directory.

11. The computer program product of claim 9, wherein to search a current table and a historical table further comprises:

searching the current table based on a valid from time; and searching the historical table based on an update time.

12. The computer program product of claim 9, further comprising computer readable program code configured to:

responsive to a request to delete a data object in said key value cache, move all data objects matching a key of the request to delete a data object to a non-infinite container and updating said current table and said historical table.

13. The computer program product of claim 9, further comprising computer readable program code configured to:

responsive to a request to update a data object in said key value cache, copy a current version of a data object matching a key of the request to update a data object from an infinite container to a non-infinite container, add an entry to said historical table, modify an entry in said current table, and store an updated data object in an infinite container.

14. The computer program product of claim 13, wherein to modify an entry in said current table further comprises one of:

removing an entry for the data object matching a key of the request to update a data object from the current table; and updating an entry for the data object matching a key of the request to update a data object in the current table by modifying create time and valid from time for said data object matching a key of the request to update a data object.

15. The computer program product of claim 9, wherein said data object is a cached web page.

16. A system for providing a bi-temporal key value cache system, comprising:
- at least one processor; and
- a memory device operatively connected to the at least one processor;
- wherein, responsive to execution of program instructions accessible to the at least one processor, the at least one processor is configured to:
- store a key directory having a plurality of key elements, wherein each key element points to a data object;
- receive a query request having an associated system time for one of said plurality of data objects, said data object being stored in a key value cache comprising bi-temporal data stored in a current table and a historical table and wherein said current table stores current versions of a plurality of data objects and said historical table stores historical versions of the plurality of data objects, each version having an associated input time, wherein the associated input time of the data objects within the current table comprise a start time and are sorted by start time and wherein the associated input time of the data objects within the historical table comprise an end time and are sorted by the end time;
- responsive to receiving said query request having an associated system time, search said key directory for said at least one key element pointing to said data object;
- responsive to finding said at least one key element, search said current table and said historical table for said data object requested and finding both said current version of said data object and said at least one historical version of said data object;
- determine from said current version and said at least one historical version of said data object which version is to be returned, wherein said determining comprises identifying a version from said current version and said at least one historical version where the input time associated with the version matches the system time associated with the query request;
- read said determined version of said data object having an input time matching the system time from said key value cache using a pointer to said determined version of said data object; and
- return said determined version of said data object having an input time matching the system time in response to said query request for said data object.

* * * * *